Patented Sept. 10, 1929.

1,727,492

UNITED STATES PATENT OFFICE.

ROSCOE TEATS, OF DENVER, COLORADO, ASSIGNOR TO AMERICAN SMELTING AND REFINING COMPANY, OF NEW YORK, N. Y., A CORPORATION OF NEW JERSEY.

PROCESS OF RECOVERING CADMIUM.

No Drawing. Application filed March 20, 1926. Serial No. 96,317.

This invention relates to the separation of cadmium from any suitable material containing this metal and is especially adapted for the treatment of baghouse dust, Cottrell separator dust and zinc plant precipitates containing cadmium, lead, copper, zinc, arsenic and other impurities. The classes of material suitable for treatment according to this process may also contain antimony, bismuth, silver and various other metals. These materials are treated in a finely divided condition and either in an oxidized or metallic state or a mixture of both.

The invention relates broadly to the separation of the cadmium from the other metals and particularly from lead, zinc, arsenic and copper by a process of distillation wherein the difference in the boiling point of cadmium and the other metals is utilized. It is well known that lead boils at a temperature of approximately 1500° C., copper at a temperature of 2310° C., zinc at 918° C. and cadmium at a temperature of 760° C. It is also well known that all of these metals when in a molten condition below their boiling point have a certain vapor tension which causes them to volatilize before boiling. The difference in the boiling points under suitable conditions of treatment and in the presence of suitable reagents permits efficient separation of the cadmium from the other metals by distillation.

The invention also relates to the separation of the cadmium from the other metals by a roasting operation which may be carried on in a roaster of well known and standard construction. The elimination of the cadmium from the other metals produces desirable metallurgical changes so that any metals that may be present may be recovered by further treatment.

This invention further consists in the new and novel features of operation and the new and original arrangements and combinations of steps in the process hereinafter described and more particularly set forth in the claims.

In the practice of my improved process the raw material such as baghouse dust, Cottrell separator dust, zinc precipitate or other material containing cadmium, lead, copper and zinc in an oxidized condition is mixed with carbonaceous material such as coal and a suitable flux such as limerock in appropriate percentages. This mixture is then ground into relatively fine particles such, for example, as will pass through a four mesh screen. The charge is then fed in the usual manner to a roaster of any well known and approved type. In practice I have found the standard type Godfrey roaster to be well adapted for carrying out my process.

The roaster is maintained at the desired temperature ranging from approximately 800° C. to 900° C. At this temperature the carbonaceous material reduces the cadmium to the metallic state. All or part of the lead, zinc, copper and other metals may also be reduced to the metallic state. The presence of carbon in the charge creates a non-oxidizing atmosphere which tends to prevent volatilization of the lead at the temperature range of the roaster. The cadmium, however, boils at this temperature and tends to pass off as a fume. Also the limerock decomposes to calcium oxide and carbon dioxide at this temperature range. The calcium oxide tends to combine with the oxides of arsenic present forming calcium arsenate or calcium arsenite or both. Calcium oxide may also combine with some of the lead existing in an oxidized condition forming calcium plumbate. The carbon dioxide creates a non-oxidizing atmosphere in the heated mixture which prevents the volatilization of lead. There is a tendency for any lead that may be oxidized to combine with carbon dioxide forming lead carbonate in which form the lead is not volatile at this temperature. The cadmium is oxidized as soon as it rises above the charge on the roaster hearth and passes out with the roaster gases as an oxide of cadmium.

In practicing my process two parts of finely divided flue dust containing cadmium, lead, zinc and arsenic were thoroughly mixed with two parts of finely divided limerock and one part of finely divided coal. This mixture was charged into a roaster and maintained at a temperature of approximately 825° C. to 850° C. The charge was subjected to this temperature for a period of approximately two hours and until the greater part of the cadmium was removed. The time required for treatment varies of course according to conditions and the character of the material. For example, one charge of material to be treated contained 56.4% lead and 12% cadmium and approximately 95% of the cadmium and only 9.2% of the lead was volatilized. As another example a baghouse dust containing 33.7% lead, 20.1% cadmium, 14.1% arsenic and 4.2% zinc was treated and approximately 9.2% of the lead, 95.1% of the cadmium, 12.1% of the arsenic and 17.1% of the zinc was volatilized.

By means of this process I am enabled to separate all or a part of the cadmium from the lead and other metals contained in a product such as flue dust during the preliminary step of roasting the material preparatory to further treatment. Consequently the subsequent steps for the recovery of the remaining metals in the material is greatly simplified and facilitated. No special form of apparatus is required but almost any standard type of roaster may be employed.

The carbonaceous material and the limerock that are preferably mixed with the material being treated not only reduce the cadmium and all or part of the lead and other metals to the metallic state, but they also produce non-oxidizing conditions in the mixture which tends to retard volatilization of the lead. Some of the lead does volatilize but more or less of its combines with the carbon dioxide from the limerock and forms a carbonate of lead in which form it is retained in the roaster residues and thus is separated from the cadmium. The cadmium, however, selectively separates and passes off as a fume into the oxidized atmosphere of the roaster above the charge where it is oxidized permitting its easy collection and recovery.

Although I have shown and described and have pointed out in the annexed claims certain novel features of the invention it will be understood that various omissions, substitutions and changes in the several steps of the process and in its operation may be made by those skilled in the art without departing from the spirit of the invention.

Having thus described my invention, I claim:

1. The process of recovering cadmium from lead bearing material, which consists in mixing the said material with carbonaceous material and limestone, dividing said material into relatively fine particles, subjecting the mixture to a temperature of 825° C. to 850° C. to selectively separate cadmium from lead as a fume, permitting the fume to oxidize and collecting the same as an oxide.

2. The process of recovering cadmium from lead bearing material, which consists in mixing the said material with carbonaceous material and limestone, dividing said material into relatively fine particles, subjecting the mixture to a temperature of 800° C. to 900° C., permitting the cadmium to boil and pass off as a fume, oxidizing said fume and collecting the same in a baghouse.

3. The process of recovering cadmium from lead bearing material, which consists in roasting the material at a temperature of approximately 800° C. to 900° C., reducing the cadmium and the lead under the conditions retarding volatilization of the lead, permitting the cadmium to volatilize and recovering the cadmium as an oxide.

4. The process of separating cadmium from material containing cadmium and lead, which consists in subjecting said material to a roasting operation at an appropriate temperature above the boiling point of cadmium and in the presence of re-agents retarding the volatilization of the lead.

5. The process of separating cadmium from flue dust containing cadmium, lead, zinc, arsenic and other metals, which consists in subjecting said material to a roasting operation at an appropriate temperature above the boiling point of cadmium and in the presence of re-agents retarding the volatilization of the lead to reduce the cadmium and lead and to fractionally distill the cadmium therefrom.

6. The process of separating cadmium from flue dust containing cadmium and lead and other volatile metals, which consists in subjecting a mixture of said material, a flux capable of retarding the volatilization of the lead and carbonaceous material to a temperature above the boiling point of cadmium and below the boiling point of lead in a non-oxidizing atmosphere to fractionally distill the cadmium from the lead.

7. The process of separating cadmium from material containing cadmium and lead, which consists in mixing said material, a flux capable of retarding the volatilization of the lead and carbonaceous material, charging said mixture into a roadster, and heating said charge to reduce the cadmium and lead and to fractionally distill the cadmium therefrom.

8. The process of separating cadmium from material containing lead and other volatile metals, which consists in mixing said material with a flux capable of retarding the volatilization of the lead and with carbonaceous material, and heating said mixture to an appropriate temperature above the boiling point of cadmium to fractionally distill the cadmium from the other volatile metals.

9. The process of separating metals from flue dust containing cadmium, lead, arsenic, zinc and other metals, consisting in mixing said dust with limerock and coal in finely divided state, and roasting the mixture to a temperature ranging approximately from 825° C. to 850° C. until the lead has been reduced to the metallic state, maintaining non-oxidizing conditions throughout and at the surface of the charge during said period, fractionally separating the cadmium from the other metals, subjecting the fume to an oxidizing atmosphere and collecting the cadmium as an oxide.

In testimony whereof I have hereunto set my hand.

ROSCOE TEATS.